United States Patent [19] [11] Patent Number: 6,086,640
Tabei et al. [45] Date of Patent: Jul. 11, 2000

[54] FORMAZAN COMPOUNDS AND METHOD OF DYEING THEREWITH

[75] Inventors: Toru Tabei; Eiichi Ogawa, both of Saitama; Shin-ichi Namba, Tokyo, all of Japan

[73] Assignee: Nippon Kayaku Kabushiki Kaisha, Tokyo, Japan

[21] Appl. No.: 09/367,156

[22] PCT Filed: Feb. 25, 1998

[86] PCT No.: PCT/JP98/00748

§ 371 Date: Aug. 9, 1999

§ 102(e) Date: Aug. 9, 1999

[87] PCT Pub. No.: WO98/38252

PCT Pub. Date: Sep. 3, 1998

[30] Foreign Application Priority Data

Feb. 28, 1997 [JP] Japan ................................. 9-060234

[51] Int. Cl.$^7$ ................................................ C09B 45/00
[52] U.S. Cl. ........................ 8/686; 8/918; 8/686; 8/549; 534/618; 534/632
[58] Field of Search .................... 534/618, 632; 8/686, 688, 918, 549

[56] References Cited

U.S. PATENT DOCUMENTS

| 4,294,580 | 10/1981 | Henk et al. . |
| 5,004,807 | 4/1991 | Pandl et al. . |
| 5,410,027 | 4/1995 | Marschner et al. . |

FOREIGN PATENT DOCUMENTS

| 3434818 | 4/1985 | Germany . |
| 55-98258 | 7/1980 | Japan . |
| 63-225662 | 9/1988 | Japan . |
| 1-149859 | 12/1989 | Japan . |
| 6-93197 | 4/1994 | Japan . |

Primary Examiner—Margaret Einsmann
Attorney, Agent, or Firm—Nields, Lemack & Dingman

[57] ABSTRACT

For dyeing (printing, for example) cellulose fibers with a reactive dye, a blue compound is greatly desired, the blue compound being capable of generating a product dyed in blue at excellent dyeing reproducibility and with good light fastness and superior fastness against chlorine water, involving less staining of white area. The invention relates to a formazan compound in a free acid form as represented by the following formula I, a dyeing method of cellulose fibers using the same and a final dyed product prepared by the method, characterized in that the compound, the method and the product are suitable so as to overcome the problem.

Formula I (wherein R represents hydrogen, sulfo group, hydroxyl group, halogen, a C1–C4 alkyl group, a C1–C4 alkoxyl group or carboxyl group; and M represents copper or nickel.)

5 Claims, No Drawings

FORMAZAN COMPOUNDS AND METHOD OF DYEING THEREWITH

TECHNICAL FIELD

The present invention relates to a formazan compound and a dyeing method of fibers therewith. More specifically, the invention relates to a dyeing method (printing method, in particular) of cellulose fibers in a vivid blue color, with excellent various fastnesses, particularly light fastness and fastness against chlorine water, with less staining of white area and additionally at good reproducibility.

BACKGROUND OF THE INVENTION

In view of vivid hue, staining of white area and fastness, reactive dyes are frequently used for dyeing (printing, in particular) of cellulose fibers. Among them, reactive dyes having monochlorotriazino group as the reactive group are preferably used because the color pastes have excellent stability on standing. More specifically, as these reactive dyes, C. I. Reactive Orange 99 as yellow dyes, C. I. Reactive Red 3:1 as red dyes and C. I. Reactive Blue 49 and C. I. Reactive Blue 5 as blue dyes are exemplified.

The reactive dyes for use in printing of cellulose fibers are required to have the following quality properties.

1. Having good dyeing reproducibility, owing to the less dependency on the conditions for intermediate drying after color pastes are printed on the fibers. This property is dependent upon the affinity of a dye to cellulose fibers; when the affinity of a dye is too low, dyeing reproducibility is poor because the dependency on the conditions for intermediate drying is elevated (when a relatively long time is needed until the dyed fiber is dried up, the migration of the dye to the back face of the resulting printed cloth is so great that the depth of shade on the surface of the printed cloth is reduced). Such dye is poor in terms of reproducibility of a color dyed by combined dyeing of yellow dyes, red dyes or blue dyes between laboratory tests and field processing.

2. Having good dyeing reproducibility owing to the less dependency of reactive dyes on the steaming conditions (steaming duration, in particular) at a reacting and fixing process. This property is dependent upon the dye reactivity; it is required that reactive dyes have such appropriate reactivity that stable reacting and fixing (high depth of shade) can be attained even when the steaming conditions (steaming duration) vary. The property has a significant influence on the dyeing reproducibility at field.

3. Reducing in staining of white area (area with no color pastes printed thereon) and being able to obtain high-quality print by printing processing.

4. Having excellent fastness (especially light fastness and chlorine fastness) in a printed product and the long color life in the printed product.

From the standpoint of the quality properties required for such dyes for printing, known blue dyes have serious drawbacks. Anthraquinone blue dyes such as C. I. Reactive Blue 49 and C. I. Reactive Blue 5 are currently used frequently, but these dyes exhibit such high dependency on the conditions for intermediate drying as described above in 1 that the reproducibility between the result dyed at laboratory tests pand the result dyed at fields is poor, leading to serious deterioration of the productivity. Additionally, these dyes are seriously poor in terms of the fastness, particularly chlorine fastness as described above in 4, so the color life of the resulting products is short.

JP-B-Hei5-21945 proposes a formazan blue dye as a means for improving the chlorine fastness, but the formazan compound described therein has a number of drawbacks described below: t he compound is highly dependent on the steaming duration as described above in 2, leading to poor dyeing reproducibility at fields, with the resultant poor productivity alike; furthermore, the compound is poor in terms of reducing of the staining of white area as described above in 3, so the resulting products dyed by printing are of deteriorated quality.

It has been highly desired to develop a blue dye capable of satisfying all of the quality properties described in 1 to 4 as required for reactive dyes to dye cellulose fibers, namely a blue dye with low dependency on the conditions for intermediate drying and low dependency on the steaming conditions and with good dyeing reproducibility, satisfactory reduced staining of white area and sufficient chlorine fastness, and with additional abilities enabling the improvement of the productivity of printing process and the preparation of high-quality products with long lives.

DISCLOSURE OF THE INVENTION

The present inventors have made serious investigations so as to overcome the above-described problems. Consequently, the inventors have found that a formazan compound with 1-naphthylamino group substituted with sulfo group, as represented by the following formula I, is excellent in terms of any of the aforementioned properties. Hence, the invention has been achieved. More specifically, the invention relates to those described below in 1 to 5.

1. A formazan compound as represented by the formula I in a free acid form:

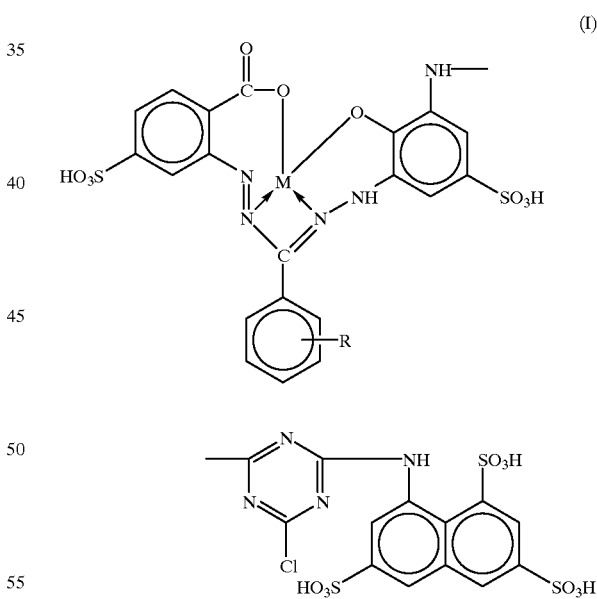

wherein R represents hydrogen, sulfo group, hydroxyl group, halogen, a C1–C4 alkyl group, a C1–C4 alkoxyl group or carboxyl group; and M represents copper or nickel.

2. The formazan compound described above in 1, wherein R represents hydrogen and M represents copper.

3. A dyeing method of cellulose fibers characterized by using the formazan compound described above in 1 or 2.

4. The dyeing method described above in 3, wherein the dyeing method is a printing method.

5. A product dyed by the dyeing method described above in 3 or 4.

BEST MODE FOR CARRYING OUT THE INVENTION

In the formazan compound as represented by the formula I in a free acid form, an example of R is hydrogen, sulfo group, hydroxyl group, chlorine, fluorine, bromine, methyl group, ethyl group, propyl group, n-butyl group, t-butyl group, methoxy group, ethoxy group, propoxy group, butoxy group or carboxyl group etc.

So as to obtain a formazan compound represented by the formula I, a formazanamino compound represented by the formula II is produced by the following method:

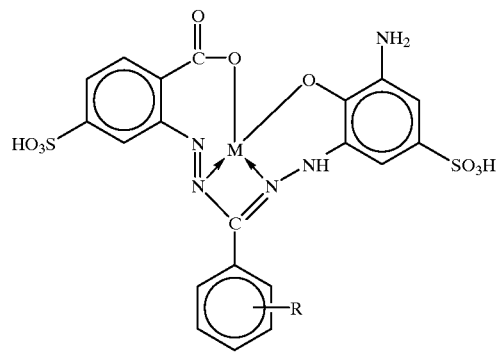
(II)

wherein R and M individually represent the same meanings as described above.

Namely, the formazanamino compound of the formula II can be prepared by coupling diazotized 6-acetylamino-2-aminophenol-4-sulfo acid with 5-sulfo-2-carboxyphenylhydrazones represented by the formula IV, followed by reaction with copper sulfate, nickel sulfate, copper chloride, nickel chloride or the like, and hydrolyzing the acetylamino group into amino group, wherein the 5-sulfo-2-carboxyphenylhydrazones of the formula IV are prepared from compounds represented by the formula III.

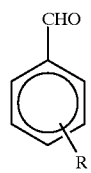
(III)

(wherein R represents the same meaning as described above.)

(IV)

CH=N—NH

SO₃H

COOH

By using the formazanamino compound thus prepared, the formazan compound of the formula I can be synthetically prepared according to for example method A or B described below.

A. The formazanamino compound represented by the formula II is allowed to react with one mole of 2,4,6-trichloro-1,3,5-triazine to prepare a condensate represented by the formula V or V', then allowing the resulting condensate to be condensed with one mole of 1-naphthylamine-3,6,8-tri sulfo acid, to obtain the formazan compound of the formula I:

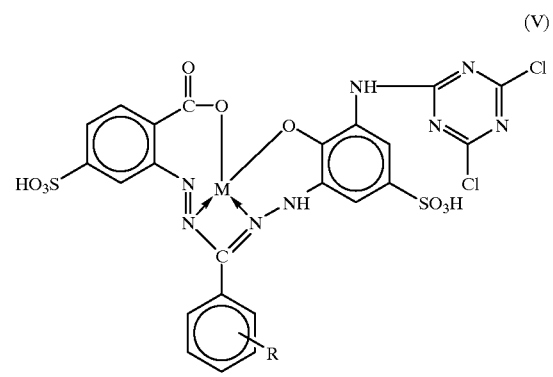
(V)

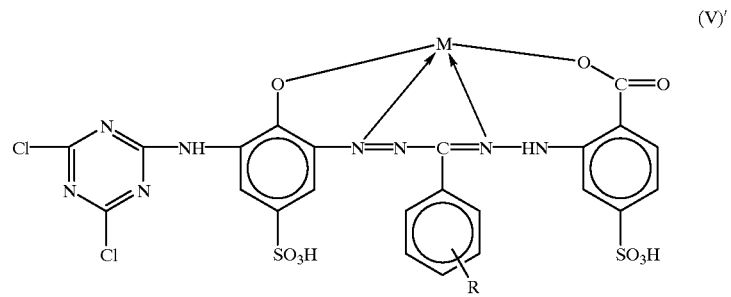
(V)' wherein compounds represented by the formula V and the formula V' are in a tautomeric relation.

These reactions are conducted in inert solvents such as water. The reaction temperature is with no specific limitation. For example, the condensation reaction between the formazanamino compound represented by the formula II and 2,4,6-trichloro-1,3,5-triazine is effected, generally at about 0° C. to about 15° C. and pH 2 to 7 for several hours, until the unchanged compound of the formula II does not any more remain. Continuously thereafter, the condensation between the compound represented by the formula V or the formula V' and 1-naphthylamine-3,6,8-tri sulfo acid is effected for example at about 15° C. to about 60° C. and pH 1 to 7 for several hours, until the unchanged 1-naphthylamine-3,6,8-tri sulfo acid does not any more remain.

B. The compound of the following formula VI is prepared by the condensation between 1-naphthylamine-3,6,8-tri sulfo acid and 2,4,6-trichloro-1,3,5-triazine; and the formazanamino compound represented by the formula II is allowed to react with one mole of the resulting compound represented by the formula VI.

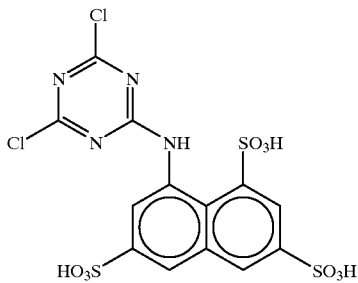

(VI)

These reactions are usually coducted in inert solvents such as water. For example, the condensation reaction between 1-naphthylamine-3,6,8-tri sulfo acid and 2,4,6-trichloro-1,3,5-triazine is effected, at 0° C. to 15° C. and pH 1 to 7 for several hours, until the 1-naphthylamine-3,5,6,8-tri sulfo acid does not remain any more. The following reaction between the compound represented by the formula II and the compound represented by the formula VI is effected for example at 15° C. to 60° C. and pH 3 to 8 for several hours, until the unchanged compound of the formula II does not any more remain.

Because it is more or less difficult to separate the objective compound by applying routine separation methods such as salting-out method or acid deposition method to the thus obtained reaction solution, preferably, the reaction solution is prepared as it is as a liquid product or the reaction solution is prepared as a liquid product by subjecting the reaction solution to a desalting process and a concentration process and adding then a solubilizer or a stabilizer such as urea, alkanolamine, alkylamine, and ε-caprolactam to the resulting solution. Alternatively, the reaction solution can be spray dried as it is.

The thus obtained formazan compound of the formula I is present in the form of a free acid or a salt thereof; the salt includes alkaashtal salts, alkaline earth metal salts, alkylamine salts, and alkanolamine salts thereof. Preferable are the sodium salt, potassium salt and lithium salt thereof, in particular. Each salt of the compound of the formula I can be prepared by separating the objective compound in the form of a free acid from the reaction solution and subjecting then the compound to treatment with an alkali agent, or by using, as each raw material, a desired salt thereof.

The formazan compound represented by the formula I in accordance with the invention is suitable for dyeing natural celluloses such as cotton and linen, regenerated celluloses such as rayon and polynosic, lyocell, and blended yarn fabrics of these fibers with other fibers; and the dyeing method includes usual dyeing methods with general reactive dyes such as printing, padding dyeing, and additionally dip dyeing. Dyed fibers or cloth can be obtained by dyeing fibers or cloth with a dye composition containing the formazan compound represented by the formula I by routine methods such as dipping, printing or padding and, if necessary, fixing the dye through thermal treatment such as drying under heating, steaming, and dry heat treatment if necessary in the presence of auxiliary dyeing agents or thickeners. Typical methods thereof are now described in more detail.

By printing method, first, a color paste is prepared by adding a dye, urea, an acid binder, and an anti-reduction agent (for example, Polymine L New; product of Nippon Kayaku, Co. Ltd.) to a stock paste such as sodium alginate and an emulsion paste; subsequently printing the color paste on fibers (materials to be dyed) and subjecting then the fibers to intermediate drying (for example at 100 to 110° C. for 2 to 3 minutes) and thereafter to a steaming process (for example at 100 to 103° C. for 5 to 10 minutes) or a dry heat process, the dye can be fixed thereon.

For applying the compound of the present invention to padding dyeing method (continuous dyeing); a pad solution is prepared, comprising a dye, an acid binder, a penetrating agent (for example, Succinol CHK; manufactured by Senka, Co. Ltd.), urea as a dye dissolving agent, urea as a water-retentive agent, and sodium alginate as a migration-preventing agent; then, fibers are subjected to padding treatment, followed by intermediate drying (for example at 100 to 110° C. for 2 to 3 minutes) and a subsequent dry heat process (for example at 150 to 170° C. for 2 to 3 minutes), and the dye is fixed thereon.

Examples of the acid binder for use in the aforementioned methods are sodium hydrogencarbonate, sodium carbonate, sodium triphosphate, sodium metaphosphate, sodium ortho- or metasilicate, and sodium hydroxide etc.

When the formazan compound of the present invention is used in the printing method, a stable depth of shade is obtained because a variation of the depth of shade is small, despite a variation of intermediate drying conditions and steaming duration, and the dyeing reproducibility is excellent. Additionally, the high-quality printed products can be obtained because of less staining of white area. In recent years, furthermore, attention has been focused on a printing method reducing amount of urea, which contains nitrogen, from the standpoint of the relation with the phenomenon of eutrophication in closed water areas due to nitrogen and phosphorus. Insofar, the use of a massive amount of urea giving an appropriate amount of water to fibers is indispensable for the purpose of reaction and fixing of reactive dyes on cellulose fibers effectively. By the use of the compound of the present invention, however, printing by a method with urea reduction is achieved. When the compound of the present invention is used for padding dyeing method, furthermore, it is a characteristic that the color variation between the start and end of the roll in the finished dyed cloth is less, too.

The formazan compound of the present invention, when used for dip dyeing method other than printing method and padding dyeing method, can provide similar good result.

The dyed products obtained by these dyeing methods in accordance with the invention exhibit a fast and vivid blue hue with excellent light fastness and fastness against chlorine water.

The same effects can be yielded, when two or more types of the compound of the present inventions are mixed together and used or when the compound of the present invention is used as a blend with the yellow dyes and red dyes and others currently for common use.

The invention is now described in more detail in the following examples but is not limited thereto. In the examples, the terms part(s) and % mean part(s) by weight or % by weight, respectively; and in the individual formulas, the sulfo group is represented in the free form.

EXAMPLE 1

Synthesis of the compound of the present invention represented by the following formula VII.

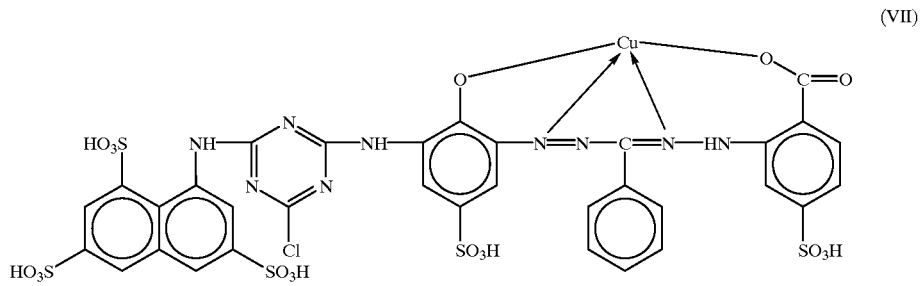

(VII)

To a solution comprising 10 parts of water, 10 parts of ice, 0.5 part of an aqueous 10% Liponox NA (trade name; a dispersant; manufactured by Lion, Co.) was added 3.8 parts of cyanuric chloride under agitation. After 30-min agitation (of the resulting suspension), a solution of 7.7 parts of 1-naphthylamine-3,6,8-tri sulfo acid dissolved in 20 parts of water was poured and added to the suspension over 30 minutes while the suspension was retained below 10° C. While the resulting mixture was retained at pH 2 to 4 by using an aqueous 10% soda ash solution at about 10° C., the reaction was continued for 3 hours under agitation. The reaction solution was added to a solution of 11.9 parts of the formazanamino compound of the formula VIII dissolved in 100 parts of water.

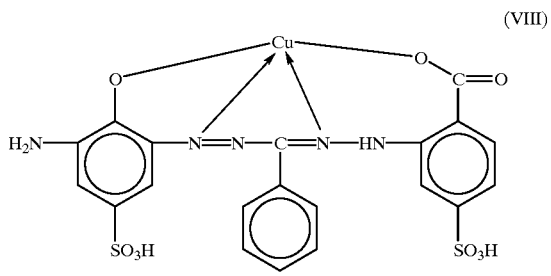

(VIII)

The temperature of the mixture was raised, and at a temperature of 30 to 40° C., then, reaction was continued for 3 hours, while the mixture was retained at pH 6 to 8 with an aqueous 10% soda ash solution. Furthermore, the reaction solution was subjected to membrane treatment for desalting and concentration, whereby 120 parts of a dye solution containing 18% of the compound of the formula VII mentioned above was obtained ($\lambda$max 610 nm in water).

EXAMPLE 2

A color paste of a composition ratio shown in the following table of 100 parts was prepared.

TABLE 1

| | |
|---|---|
| Compound of Example 1 (dye solution) | 8 parts |
| Urea | 10 parts |
| Sodium hydrogencarbonate | 2 parts |
| Polymine L New (Note 1) | 1.5 parts |

TABLE 1-continued

| | |
|---|---|
| Warm water | 28.5 parts |
| Stock paste (Note 2) | 50 parts |
| Total | 100 parts |

Note 1: Polymine L New; trade name; anti-reduction agent; manufactured by Nippon Kayaku Co. Ltd.
Note 2: Stock paste: Snow Algin M (trade name) (a sodium alginate stock paste comprising 5 parts of a sodium alginate and 95 parts of water), manufactured by Fuji Chemicals, Co. Ltd.

The color paste was printed on mercerized cotton broad weighed 50 g, followed by intermediate drying at 100° C. for 3 minutes and subsequent steaming process in saturated steam at 100° C. for 8 minutes, for reacting and fixing of the dye.

Then, the mercerized cotton broad was washed in water and warm water and subjected to soaping in a boiling water bath of 1000 g containing 2 g of Monogen (trade name; anion surfactant manufactured by DAI-ICHI KOGYO SEIYAKU, CO. Ltd.) for 15 minutes, followed by washing in water. The resulting printed product exhibited a vivid blue with excellent light fastness and fastness against chlorine water and staining of white area is almost nothing.

EXAMPLE 3 to 10

By using compounds produced according to Examples 1 and 2, cotton was dyed (by printing). Tables 2 to 4 show the structural formulas of the synthesized compounds, and the hue of cotton dyed with the compounds, together with the $\lambda$max in water of the compounds.

TABLE 2

| Example No. | Structural formula | Hue | λmax (nm) |
|---|---|---|---|
| 3 | (structure shown) | blue | 609 |
| 4 | (structure shown) | blue | 595 |
| 5 | (structure shown) | blue | 609 |

TABLE 3

| Example No. | Structural formula | Hue | λmax (nm) |
|---|---|---|---|
| 6 | (structure shown) | blue | 608 |

TABLE 3-continued

| Example No. | Structural formula | Hue | λmax (nm) |
|---|---|---|---|
| 7 | (structure shown) | blue | 600 |
| 8 | (structure shown) | blue | 609 |

TABLE 4

| Example No. | Structural formula | Hue | λmax (nm) |
|---|---|---|---|
| 9 | (structure shown) | blue | 610 |
| 10 | (structure shown) | blue | 610 |

EXAMPLE 11

According to the printing method described in Example 2, rayon muslin was printed, using 5 parts of the compound of Example 1. The resulting dyed product exhibited a vivid blue with excellent light fastness and fastness against chlorine water. Even when the steaming duration was changed to 4, 8 and 16 minutes, the depth of shade was only slightly changed.

EXAMPLE 12

A padding solution was prepared, using 40 parts of the compound of Example 1, 20 parts of sodium carbonate, 150 parts of urea, one part of Snow Algin (trade name) and 1000 parts of pure water; mercerized cotton broad of 50 g was subjected to padding process at a squeezing ratio of 70%, followed by intermediate drying at 100° C. for 3 minutes. Then, the mercerized cotton broad was subjected to dry heat process at 160° C. for 3 minutes, for reacting and fixing the dye on the cotton broad. Thereafter, the cotton broad was washed in water and washed in warm water, and was then subjected to soaping in a boiling water bath of 1000 g containing 2 parts of Monogen (trade name; anion surfactant; manufactured by DAI-ICHI KOGYO SEIYAKU, CO. Ltd) for 15 minutes, followed by additional washing in water.

The resulting dyed product exhibited a vivid blue with excellent light fastness and good chlorine fastness.

Comparative Tests

The compound of the present invention (Example 1) and 5 types of known dyes (C. I. Reactive Blue 49 as Comparative Example 1, C. I. Reactive Blue 5 as Comparative Example 2, the compound of Example 17 described in JP-B-Hei5-21945 as Comparative Example 3, the compound of Example 19 described in the same gazette as Comparative Example 4, and the compound of Example 25 described in the same gazette as Comparative Example 5) were compared to each other, regarding the properties thereof for printing according to the following methods.

A. Common Printing Method 100 parts of individual color pastes of the following compositions in Table 5 are prepared.

TABLE 5

| Each compound (dye) | X parts (Note 3) |
|---|---|
| Urea | 10 parts |
| Sodium hydrogencarbonate | 2 parts |
| Polymine L New (Note 1) | 1.5 parts |
| Warm water | (36.5-X) parts |
| Stock paste (Note 2) | 50 parts |
| Total | 100 parts |

Note 1: Polymine L New: trade name; anti-reduction agent; manufactured by Nippon Kayaku Co. Ltd.
Note 2: Stock paste: Snow Algin M (trade name) (a sodium alginate stock paste comprising 5 parts of a sodium alginate and 95 parts of water), manufactured by Fuji Chemical, Co. Ltd.
Note 3: Depending on the test for each of 4 items described below, the amount of each compound (dye) varies; therefore, the amount is herein expressed generally as X parts. The amount of each compound (dye) at each test was specifically described in the corresponding part hereinbelow (test conditions for each test item).

The color paste was printed on mercerized cotton broad of 50 parts, followed by intermediate drying at 100° C. for 3 minutes and subsequent steaming process in saturated steam at 100° C. for 8 minutes, for reacting and fixing of the dye thereon.

Then, the mercerized cotton broad was washed in water and, washed in warm water and was then subjected to soaping in a boiling water bath of 1000 g containing 2 parts of an anion surfactant for 15 minutes, followed by washing in water.

B. Test Conditions of Each Test Item

1. Dependency on intermediate drying conditions

Using 4 parts of the compound of Example 1 [the compounds of Comparative Examples 1 to 5 were individually used at their amounts corresponding to the same OD (optical density) values as that of the compound of Example 1] and 2 parts of C. I. Reactive Orange 99, printed products were prepared by dyeing according to the common printing method, except for the two levels of the intermediate drying conditions, namely 100° C. for 3 minutes and 40° C. for one hour.

The color change of the surface each of the resulting printed products and the strike-through state (degree of dye migration to the back surface of the printed products) as for reference were visually determined, and the results are shown in Table 6. The assessment results are ranked according to the following criteria.

Overall Assessment:

o: under the two-level drying conditions, the color of the surface (surface color) is identical, with low strike-through state (low dependency on intermediate drying conditions; good state).

x: under the two-level drying conditions, the color of the surface (surface color) under the latter conditions is apparently changed, involving high strike-through state, compared with the surface color under the former conditions (high dependency on intermediate drying conditions; poor state).

2. Dependency on steaming duration (ST dependency)

Except for the use of 4 parts of the compound of Example 1 (the compounds of Comparative Examples 1 to 5 were individually used at their amounts corresponding to the same OD values as that of 4 parts of the compound of Example 1) and that the steaming duration varied from 2 minutes to 4 minutes, 8 minutes and 16 minutes, individual printed products were prepared by dyeing according to the common printing method.

The reflectance of each of the resulting printed products was measured with a spectrophotometer CE-3100 manufactured by Macbeth Co., to determine the Q-Total value (optical density). Table 6 shows the ratio (QT ratio) of the Q-Total value to the Q-Total value determined for 8-min steaming and defined as a base line value 100. The assessment results marked with o or x are determined according to the following grades.

Assessment:

o: QT ratio above 80, when the steaming duration was any one of 2, 4, and 16 minutes.

x: compound with at least one QT ratio below 79, when the steaming duration was one of 2, 4 and 16 minutes.

3. Degree of staining of white area (stained degree of white area)

Except for the use of 8 parts of the compound of Example 1 (the compounds of Comparative Examples 1 to 5 were individually used at their amounts corresponding to the same OD values as that of 8 parts of the compound of Example 1), processes up to steaming process were conducted according to the common printing method; then, the following washing process was performed to determine the stained degrees of white area (white cloth) during the process, on the basis of the white cloth prior to the washing process, according to the Gray Scale for staining according to JIS L 0805.

Washing process

In 100 parts of pure water were placed 2.5 parts of printed (steaming processed) cloth and 2.5 parts of mercerized cotton broad (white cloth), for 10-min treatment at 30° C. Thereafter, the printed cloth and the white cloth were taken out and dewatered, which were then placed in 100 parts of fresh pure water again, for 10-min treatment at 90° C., followed by dewatering and drying.

The stained degree of the mercerized cotton broad, (white cloth) was determined on the basis of white cloth, by the Gray Scale for staining according to JIS L 0805. The results are shown on the determined grades marked with o and x in Table 6. Larger grades indicate better results (with small staining degrees).

Grades of 4 or more are marked with o; and grades of 3 or less are marked with x.

4. Fastness against chlorine water

Printed products were obtained by using 6 parts of the compound of Example 1 (the compounds of Comparative Examples 1 to 5 were individually used at their amounts corresponding to the same OD values as that of 6 parts of the compound of Example 1) according to the common printing method.

According to the high-level test of Fastness against Chlorine Water (at effectivechlorineof 20 ppm) of JIS L 0884, the resulting printed cloth was tested of its fastness against chlorine water. The results are shown in Table 6, along with the assessment results represented with grades and marked with o and x. Larger grades indicate better results (less color change or discoloration).

The aforementioned individual results are collectively shown in Table 6.

As is apparently shown in Table 6, C. I. Reactive Blue 49 (the compound of Comparative Example 1) and C. I. Reactive Blue 5 (the compound of Comparative Example 2) currently for frequent use are with too low dye affinity, so these dyes cause high strike-through state to reduce the blue depth of shade on the surface when the resulting dyed products are dried at a relatively low temperature (corresponding to the drying condition for test dyeing), leading to considerable change of the color to a yellowish hue.

Thus, the reproducibility (reproducibility between test dyeing and field processing) is poor. Additionally, these dyes are poor in terms of fastness against chlorine water.

On the other hand, the compounds (dyes) of Examples 17, 19 and 25 as described in JP-B-Hei5-21945 are poor, because these compounds cause large variations of the depth of shade, following the change of the steaming duration, with poor reproducibility (in this case, reproducibility between inter-site processes or inter-steaming machines) and additionally with severe staining of white area.

Only the compound of Example 1 has low dependency on both the intermediate drying conditions and steaming duration, so the compound can give a stable depth of shade with excellent dyeing reproducibility, and both with less staining of white area and with good fastness against chlorine water.

Hence, it is apparently shown that the compound of the present invention is a blue dye capable of improving the productivity of printing processing and obtaining high-quality products with a long life.

TABLE 6

| Compounds | Dependency on intermediate drying conditions | | | ST dependency | | White area staining | | Chlorine water fastness | |
| --- | --- | --- | --- | --- | --- | --- | --- | --- | --- |
| | surface color | strike-through state | general assessment | QT ratio | assessment | grades | assessment | high-level test values | assessment |
| Compound of Example 1 | identical | low | ○ | 94 100 *(100) 99 | ○ | 4 | ○ | 3–4 | ○ |
| Compound of Comparative Example 1 | considerably yellowish | high strike-through of bluish hue | X | 83 94 *(100) 100 | ○ | 4–5 | ○ | 1–2 | X |
| Compound of Comparative Example 2 | considerably yellowish | high strike-through of bluish hue | X | 85 95 *(100) 99 | ○ | 4–5 | ○ | 2 | X |
| Compound of Comparative Example 3 | identical | low | ○ | 106 101 *(100) 73 | X | 2–3 | X | 3–4 | ○ |
| Compound of Comparative Example 4 | identical | low | ○ | 107 101 *(100) 72 | X | 2–3 | X | 4 | ○ |
| Compound of Comparative Example 5 | identical | low | ○ | 68 90 *(100) 98 | X | 2–3 | X | 4 | ○ |

Notes:
Supplementary description of each item in Table 6
1. Dependency on intermediate drying conditions Hue and strike-through state of product dried at 40° C. for one hour, as judged on the basis of the hue and strike-through state of product dried at 100° C. for 3 minutes.
2. ST dependency
QT ratios are expressed as the ratios in % of Q-Total values at steaming durations of 2, 4 and 16 minutes to the Q-Total value (represented as *(100) in the table) at a steaming duration of 8 minutes; the ratios are in the sequential order for 2, 4 and 16 minutes from the top.
3. White area staining
Grades are shown according to the Gray Scale for Staining according to JIS L 0805.
4. Chlorine water fastness
Grades are based on the values at the tests of fastness against chlorine water according to the high-level test (at effective chlorine of 20 ppm) of the Fastness against Chlorine Water of JIS L 0884.
5. Compound of Comparative Example 1
C. I. Reactive Blue 49.
6. Compound of Comparative Example 2
C. I. Reactive Blue 5.
7. Compound of Comparative Example 3

Compound of Example 17 of JP-B-Hei5-21945.
8. Compound of Comparative Example 4
Compound of Example 19 of JP-B-Hei5-21945.
9. Compound of Comparative Example 5
Compound of Example 25 of JP-B-Hei5-21945.

Industrial Applicability

The compound of the present invention can dye cellulose fibers in a vivid blue with high dyeing reproducibility, and the resulting dyed product characteristically has excellent light fastness and excellent fastness against chlorine water, with less staining of white area. Accordingly, the inventive dye is very useful for improving the productivity of dyeing processing and is utilized for producing dyed products with high quality and a long life.

We claim:

1. A formazan compound in a free acid form as represented by the formula I:

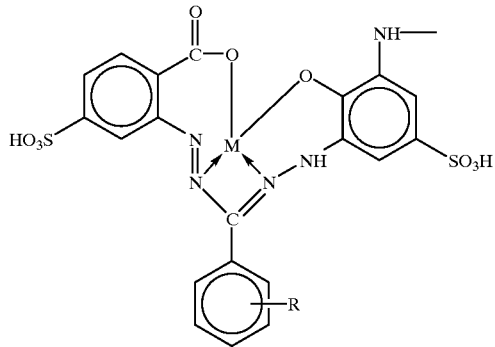

(I)

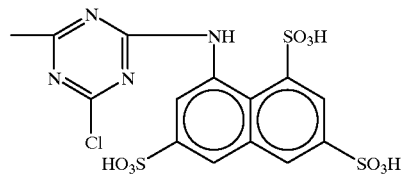

wherein R represents hydrogen, sulfo group, hydroxyl group, halogen, a C1–C4 alkyl group, a C1–C4 alkoxyl group or carboxyl group; and M represents copper or nickel.

2. A formazan compound according to claim 1, wherein R represents hydrogen and M represents copper.

3. A dyeing method of cellulose fibers characterized by using a formazan compound according to claim 1 or 2.

4. A dyeing method according to claim 3, wherein the dyeing method is a printing method.

5. A product dyed by a dyeing method according to claim 3 or 4.

* * * * *